Figure 1:
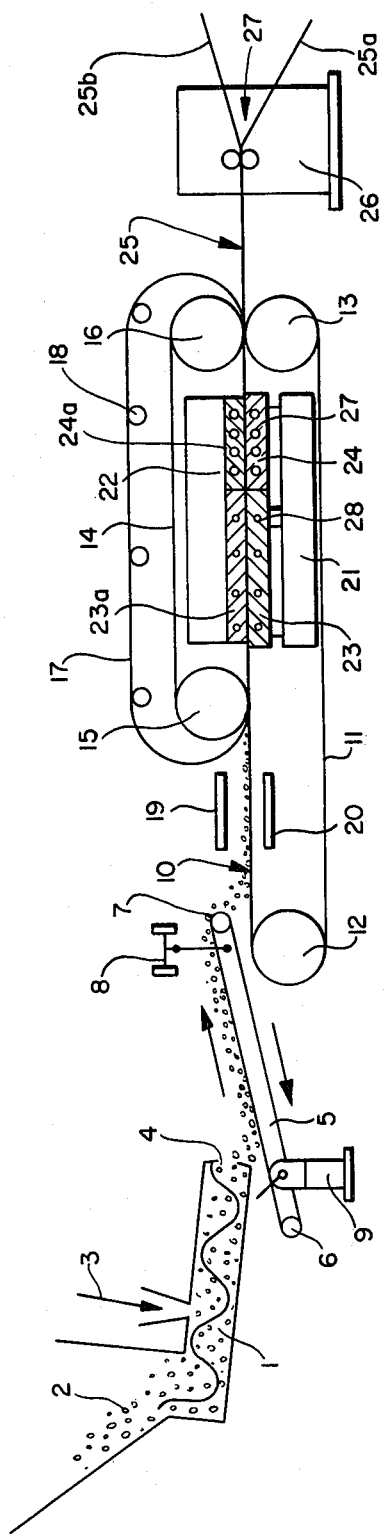

United States Patent [19]

Brinkmann et al.

[11] 4,396,566
[45] Aug. 2, 1983

[54] PROCESS FOR THE CONTINUOUS MANUFACTURE OF SHEETING FROM THERMOPLASTIC SYNTHETIC RESINS

[75] Inventors: Hans Brinkmann; Bernhard Kraemer; Herbert Schulte; Uwe Sommermeyer, all of Troisdorf, Fed. Rep. of Germany

[73] Assignee: Dynamit Nobel Aktiengesellschaft, Troisdorf, Fed. Rep. of Germany

[21] Appl. No.: 294,051

[22] Filed: Aug. 18, 1981

[30] Foreign Application Priority Data

Aug. 23, 1980 [DE] Fed. Rep. of Germany ....... 3031839

[51] Int. Cl.$^3$ .................... B29D 17/14; B29F 5/02
[52] U.S. Cl. .................................. 264/70; 264/22; 264/37; 264/112; 264/126; 264/257; 264/DIG. 69; 425/115; 425/364 R; 425/407; 25/456; 425/DIG. 46
[58] Field of Search ........... 264/321, 51, 53, DIG. 69, 264/37, 70, 22, 112, 126, 257; 425/115, 364 R, 407, 456, DIG. 46

[56] References Cited

U.S. PATENT DOCUMENTS

| | | | |
|---|---|---|---|
| 3,012,901 | 12/1961 | Reese | 264/70 X |
| 3,399,426 | 9/1968 | Weasel, Jr. | 264/DIG. 69 |
| 3,488,411 | 1/1970 | Goldman | 264/45.8 X |
| 3,607,999 | 9/1971 | Corbett et al. | 264/321 X |
| 3,617,590 | 11/1971 | Neukomm et al. | 264/37 |
| 3,754,065 | 8/1973 | Hofmann et al. | 264/70 |
| 3,883,624 | 5/1975 | McKenzie et al. | 264/37 |
| 4,189,291 | 2/1980 | Longhi | 264/37 X |
| 4,238,176 | 12/1980 | Cottrell, Jr. et al. | 264/257 X |
| 4,239,715 | 12/1980 | Pratt | 264/70 |
| 4,254,068 | 3/1981 | Otsuka | 264/37 |
| 4,363,771 | 12/1982 | Murray | 264/126 X |

FOREIGN PATENT DOCUMENTS

| | | | |
|---|---|---|---|
| 1679822 | 10/1971 | Fed. Rep. of Germany . | |
| 1479090 | 12/1971 | Fed. Rep. of Germany . | |
| 2319254 | 10/1974 | Fed. Rep. of Germany | 264/70 |
| 1928405 | 10/1975 | Fed. Rep. of Germany . | |
| 52-49280 | 4/1977 | Japan | 264/37 |

Primary Examiner—Philip E. Anderson
Attorney, Agent, or Firm—Antonelli, Terry & Wands

[57] ABSTRACT

A process for the continuous manufacture of sheeting from thermoplastic synthetic resins includes the steps of applying thermoplastic synthetic resin, in the form of particles, such as shreds, crumbs, cuttings, pieces, chips, or the like, continuously as a sheet-like layer of raw material to a moving support; passing the raw material layer through a heating zone to thereby preheat the material layer to a temperature approximately in the range from 100° to 140° C.; pressing the preheated material layer continuously over its full area during travel through a treatment zone so that, in a first phase, the raw material layer is compacted and welded under the effect of a pressure of from about 10 to 60 kp/cm$^2$ and at the same time the material layer is heated to a temperature in the range from about 160° to 220° C; and, in a second, directly following phase, while maintaining said pressure, cooling the material layer and simultaneously pressing the layer to the thickness dimension predetermined by the amount of raw material layer applied to the moving support.

20 Claims, 1 Drawing Figure

PROCESS FOR THE CONTINUOUS MANUFACTURE OF SHEETING FROM THERMOPLASTIC SYNTHETIC RESINS

The invention relates to a process for the continuous manufacture of sheeting from thermoplastic synthetic resins, especially sheeting useful as covering material for the construction field, wherein the thermoplastic synthetic resin, in the form of particles, such as shreds, crumbs, cuttings, pieces, chips, or the like, is continuously piled up or poured on to form a sheet-like layer of raw material; the layer of raw material is heated and pressed and welded together in sections to produce the sheeting with the use of pressure, and the sheeting is thereafter cooled.

It is known for the manufacture of inherently patterned sheets or panels of a thermoplastic synthetic resin to roll a mixture of individually differently colored shreds of thermoplastic mixtures into a sheet, or to roll such shreds into a unicolored sheet of a thermoplastic mixture; and then to combine one or more of these preliminarily patterned sheets and a sheet made from a compatible thermoplastic mixture and formed of the basic color of the preliminarily patterned sheet or sheets, with the use of pressure and heat; and to calender the thus-combined sheets in the warm condition while reducing the thickness. Such a process for the production of a conductive floor covering has been disclosed, for example, in DAS [German Published Application] No. 1,928,405. However, this process is burdened by the considerable disadvantage that it is possible only to manufacture sheets having a relatively minor thickness of a few millimeters since the rolling of sheets having larger thicknesses of above 5 mm presents considerable difficulties due to the danger of bubble formation, i.e. air inclusions.

Furthermore, on account of the calendering step, taking place with reduction of the thickness of the material, an oriented structure of the pattern of the sheets in the calendering direction is also perforce produced and, in case of vigorous calendering, there is, moreover, the danger that the structure of the pattern is more or less blurred by the formation of mixed colors. When using particles having a differing melt viscosity, this mixed color and premixing effect is even further pronounced.

Therefore, in order to manufacture patterned sheets from thermoplastic synthetic resins with a nondirectional patterning, techniques have been developed with avoidance of rolling or calendering as the last step of the manufacture of the sheets or panels, as described, for example, in DOS [German Unexamined Laid-Open Application] No. 1,479,090 and in DAS No. 1,679,822. In the last-mentioned process, thermoplastic synthetic resin chips are piled up uniformly into a continuous stack or block and heated in the stack, whereupon the stack is cut off into a raw block and compressed in a box mold. From the pressed block, the desired panels are then cut off. It is possible with this method to obtain patterned panels of compact thermoplastic synthetic resin with an unoriented pattern and also with a formation of only minor proportions of mixed colors. However, one disadvantage of these processes resides in the discontinuous mode of operation which is costly, requires the availability of many molds and the provision of long cooling-off times for the pressed blocks, and therefore does not permit economical manufacture.

The invention is based on the object of providing a process which is continuous throughout, for the production of sheets of thermoplastic synthetic resins with the use of thermoplastic synthetic resin particles, by means of which it is made possible to produce, on the basis of the particles employed, unoriented, patterned sheets even of a relatively large, compact thickness while avoiding air inclusions and rolling and calendering processes.

This object has been attained according to the invention by providing that the piled up layer of raw material of the thermoplastic synthetic resin particles passes through a heating zone and is preheated during this step to a temperature approximately in the range of from 100° to 140° C. and is then pressed continuously into a flat sheet while passing through a treatment zone in such a way that, in a first phase, a compacting and welding step is carried out under the effect of a pressure in the range from 10 to 60 kp/cm$^2$ and while heating to a temperature approximately in the range from 160° to 200° C.; and, in a second phase, which follows directly after the first phase, a cooling step is conducted while maintaining the pressure and simultaneously a pressing step is carried out to a predetermined thickness dimension. It is surprisingly possible by means of the process of this invention, which is continuous throughout, to manufacture sheet stock of thermoplastic synthetic resin particles in a homogeneous structure, i.e. densely compressed and compacted, even in thicknesses up to at least 10 mm. According to the invention, a continuously progressing flat (i.e. large-area, two-dimensional) pressing step is executed for the compacting and welding together of the thermoplastic synthetic resin particles into the sheet, avoiding the disadvantages of linear pressing during rolling or calendering of sheets and also replacing the heretofore customary, discontinuous sectional pressing procedure. When pressing the particles perpendicularly to the surface of the sheet, the particles essentially retain their shape and are only slightly deformed so that a predominantly unilateral flux of the material is avoided. However, as a result, casings or envelopes around the particles are likewise preserved.

It is possible by means of the process of this invention to homogeneously compress particles of an identical or different material composition, particle configuration, and size and of differing colorings continuously into sheets of any desired thickness. Even with a differing melt viscosity of the particles, no appreciable mixed color effect occurs, and contours are sharply retained. Consequently, unoriented patterns, such as marbling effects can be produced in thermoplastic sheets by means of the process of this invention, namely throughout the entire width of the sheet and its thickness. The particles can additionally be provided with a colored casing (or envelope) to provide an improved contrast in the pattern within the sheet. Moreover, it is also possible to make the casing around the particles electrically conductive, for example by using metallic powder pastes or carbon black pastes so that the finished, compacted and pressed sheet stock exhibits a defined electric conductivity. A preferred field of usage of the sheets produced with the process of this invention is patterned and/or conductive coverings for the construction industry, especially floor coverings or decorative panels for the floor, the wall, and the ceiling. The method according to this invention can be used advantageously in conjunction with particles on the basis of a vinyl polymer and/or a copolymer of vinyl chloride, e.g. polyvinyl chloride which contains plasticizers and optionally other auxiliary agents, such as stabilizers, pigments, etc., fillers, and similar agents. Soft PVC molding compositions are used especially for the manufacture of floor coverings. However, it is also possible to employ mixtures of particles from different thermoplastic synthetic resins or also synthetic resin mixtures; in this connection, thermoplastic synthetic resins such as acrylates, polyesters, ethylene vinyl acetate, etc., are especially suitable. Another advantageous further development of the process of this invention resides in the use of particles of crosslinkable thermoplastic synthetic resins such as, in particular, ethylene-propylene copolymers and ethylene-propylene-diene terpolymers, optionally in blends with other thermoplastic synthetic resins. Crosslinking is advantageously effected by means of peroxides provided within the mixture of thermoplastic synthetic resin particles, but crosslinking with the aid of ionizing radiation is likewise possible. In this connection, another feature according to this invention provides that after the pressing and welding of the particles into the sheet, crosslinking of the synthetic resin is carried out either within the treatment zone or after leaving the treatment zone. The thus-produced sheets have the advantage that they benefit, in the first process step of homogeneous compressing and welding, still from the thermoplastic properties of the noncrosslinked synthetic resin, while the subsequent crosslinking provides a corresponding enhancement of the desired mechanical properties. Care must be taken in this combined process that the temperatures during pressing and welding of the thermoplastic particles are maintained below the activating temperature of the crosslinking agent employed, which agent is contained in the layer of raw material and/or in the particles, so that first compact homogeneous compression and welding are obtained, and crosslinking of the synthetic resin in the sheet is effected by an appropriate, subsequent increased-temperature phase which can be carried out at the end of the welding step or also at a very much later point in time.

The sheet, compressed to the desired thickness dimension, can be cooled directly to a temperature of between 50° and 80° C. in a further development of the process of this invention, and can then be split up subsequently into desired finished sheets of a corresponding thickness. It is possible, for example, to split a compressed sheet of 6 mm into three sheets of 2 mm each, or to split up a compressed sheet of 5 mm into two sheets of 2.5 mm each.

The process of this invention is to be carried out advantageously for producing the layer of raw material in such a way that the particles are applied to a moving support in a traversing or reciprocating motion to obtain the desired thickness and width of the layer of raw material, a single application step being sufficient to attain the respectively desired format of the raw material sheet, whereby also the final thickness of the pressed sheet is predetermined.

However, it is also possible to produce by means of the process of this invention composite sheets having a supporting sheet or reinforcing sheet, wherein the particles for the layer of raw material are applied to a supporting sheet especially a textile supporting sheet made up of fleece, mats, fabrics, meshwork of mineral fibers and/or synthetic resin fibers, such as glass fibers, polyester fibers, polyamide fibers, and are pressed into a composite sheet in the treatment zone.

A preferred embodiment of the process of this invention provides that the particles for the raw material layer are applied to an endlessly revolving bottom belt and are preheated thereon, and thereafter the topside of the layer of raw material is covered with an endlessly revolving top belt and pulled continuously through a press, wherein the press is heated in the inlet zone and cooled in the outlet zone. It is surprisingly possible to compress and weld together thermoplastic synthetic resin particles homogeneously and in a continuous fashin into compact sheets by twin-belt presses as such presses have been employed heretofore especially in the manufacture of chipboards or for the smoothing out of thin synthetic resin films. In this connection, the synthetic resin particles can exhibit medium diameters of a few millimeters up to 10 mm and more, while the smallest lateral lengths can be below 1 mm and the largest lateral lengths can be 50 mm and more.

In the process of this invention, the synthetic resin particles are loosely applied to the bottom belt and, after preheating without the use of pressure, are continuously compacted, welded together, pressed, and cooled over their entire area while continuing the conveying operation. A prerequisite for executing the process of this invention is the weldability or heat-sealability of the thermoplastic synthetic resin particles employed. The thermoplastic synthetic resin particles to be used for the process of this invention can be produced in various ways. For example, unicolored or marbled raw sheets can be manufactured by rolling and then cut into chips. It is also possible to extrude rods and subdivide same into appropriate pieces, wherein unicolored and marbled, i.e. multicolored, multilayer particles can be produced. It is likewise possible to employ waste strips from calendered, rolled thermoplastic synthetic resin sheet stock by recycling. One advantageous embodiment provides that the thermoplastic particles are extruded in rod shape by various extrudes with dies, in differing colorings, and, directly from the cutting step, are fed continuously for piling up the layer of raw material. The process according to the invention can be executed by travelling speeds of 0.5 to at least 2.0 m/min. for continuously pressing. The preferred thickness of the finished pressed sheets is between 4 to 8 mm.

The top and bottom belts of the press are preferably made of stainless steel and do not require any special coat to prevent adherence of the thermoplastic sheet. The finished pressed sheet can be readily taken off at the end of the press. However, according to another suggestion of this invention, there is also the possibility of supporting or shoring up the layer of raw material while traveling through the press even along the side by concomitantly revolving belts. According to another suggestion of the invention the press is constructed as a double ram vibrating press with an upper and a lower press part. The treatment zone is installed in the upper and lower press part. Hereby the heating of the material layer in the treatment zone is effected by electrically resistant heating means which are heated up to 160° to 220° C. and are installed in the first zone of the upper and lower press part. The cooling of the material layer in the treatment zone is effected by cooling water of a temperature of 20° to 100° C. which is flowing within channels in the following zone of the upper and lower part of the press.

In case the finished pressed sheet is to be embossed directly afterwards, since it will not be split any more, the invention proposes to cool the sheet in the press only to a temperature of between about 120° and 140° C. and thereafter to emboss the sheet directly, for example by means of a pair of embossing rollers. Only thereafter does cooling take place down to room temperature.

In the accompanying drawing, FIG. 1 shows schematically an arrangement according to the invention for conducting the process of this invention.

The thermoplastic synthetic resin particles 2, prefabricated, for example, on rolling mills, calenders, extruders and cut into pieces, are continuously fed into the mixing and conveying unit 1. The mixing unit 1 can furthermore comprise a feed hopper for adding color pastes or conductive pastes 3 for encasing the particles 2. At the end of the mixing unit 1, the particles 2 are conveyed continuously from the discharge opening 4 to the revolving distributor belt 5. The distributor belt 5 is supported unilaterally in the bearing stand 9 and is guided over guide rollers 6,7. At the conveying end of the distributor belt 5, the belt is guided by the swivel mechanism 8 to be pivotable at right angles to its conveying direction with the fulcrum being on the bearing stand. The distributor belt 5 continuously throws the particles 2 on the bottom belt 11 extended at the front from the press constructed as a double ram vibrating press 21, 22, which bottom belt revolves endlessly about the guide rollers 12, 13. The upper part 22 of the vibrating press is for example fixed, the lower part 21 moves up and down (vibrating part) both made of metal plates. The parts 21,22 are provided with the treatment zone parts, i.e. cooling zones 24, 24a and heating zones 23, 23a. The cooling is effected by cooling water flowing through channels 27 and the heating by electrical resistant means 28. In correspondence with the changing motion of the distributor belt 5, the layer 10 of raw material is applied to the bottom belt 11 in the desired width and, depending on the speed of the distributor belt, in the desired thickness. Subsequently, the raw material layer, piled up loosely from particles, travels through a heating device for preheating to 100°–140° C., for example, a device provided with infrared radiators 19 and 20 acting on the topside of the raw material layer 10 and on the underside of the bottom belt 11. After heating the raw material layer to the desired temperature, the raw material layer 10 is fed to the continuous flat pressing step with compacting and welding. This takes place in the double ram vibrating press 21, 22 wherein the layer of raw material is covered on the topside by the endlessly revolving top belt guided around the guide rollers 15, 16, and is drawn into the actual vibrating or oscillating press 21, 22 between the top belt 14 and the bottom belt 11. The vibrating press 21, 22 operates with a constant pressure ranging between 10 and 60 kp/cm² and is selected in dependence on the material and thickness of the raw material layer and the operating speed, i.e. conveying velocity. the press 21, 22 is subdivided into a heating zone and a cooling zone, wherein the draw-in or entry region of the press is fashioned as a heating zone 23, 23a for example with electric resistance heating means, and the discharge region is fashioned as a cooling zone 24, 24a with a cooling device; in this connection, the heating zone and the cooling zone adjoin each other directly, and their extensions are dependent on the conditions involved. Normally, the heating zone will comprise at least half the operating length of the press. For a lateral bounding of the raw material layer, the revolving lateral supporting belts 17 are provided which are guided over supporting rollers 18. After being discharged from the press, the finished pressed sheet is fed, for example, directly to a splitting device 26 with a splitting blade 27 whereby the sheet is split into the partial sheets 25a and 25b. It is also possible to arrange a pair of embossing rollers directly following the press.

The installation as illustrated operates in such a way that the thermoplastic particles, especially on the basis of soft PVC or ethylene-propylene elastomer, are uniformly piled by way of the distributor belt 5 onto the forwardly extended bottom belt 11 of the press. The thus-piled layer of raw material is preheated to 100°–140° C. while passing through the preheating device and is continuously introduced into the press. In the heating zone of the press, the layer of raw material is compacted, welded together, and finally shaped while exerting a pressure load of 10–60 kp/cm² in continuous travel through the press at material temperatures of 160° to 180° or 220° C. With the travel through the press being continued, the sheet is fixed in its thickness in the cooling zone of the press while maintaining a constant pressure, namely the pressure of 10–60 kp/cm². With the use of ethylene-propylene elastomer, it is additionally possible to trigger within the press vulcanization, i.e. crosslinking under the effect of the pressure and the temperature after the compacting and welding of the particles during the continuous process.

It is possible by means of the process of this invention to continuously press-mold weldable thermoplastic synthetic resin particles in varying particle shapes, different recipes or formulations, and variegated coloring into homogeneous compact sheets of a thickness of 1.5 mm up to at least 10 mm. The colored encasing of the individual particles remains preserved during the pressing step in spite of differing melt viscosities which may possibly be present. Thereby intermixing and dissolution of the colored encasing are avoided and, at the end, a patterned product free of orientation is obtained wherein, for example, the colored casings around the individual particles visibly reappear in section, for example when the material is split on the split-up surface, in the form of edgings around individual particles. When conducting the process of this invention for the production of the thermoplastic, especially patterned and optionally conductive sheet stock, a low shrinkage product is also obtained.

In the illustrated installation according to FIG. 1, it is, for example, also possible to choose a different feeding means for the particles 2 to the distributor belt 5, in place of the mixing unit 1 as shown. The distributor belt 5 essentially serves the purpose of effecting a uniform piling of the particles 2 into the raw material layer in the desired width and height. Different ways of applying the particles 2 to the forwardly extended bottom belt 11 of the press are likewise possible in accordance with this invention. However, the installation illustrated here has the advantage of providing economical manufacture in a continuous fashion of the desired product with high quality, requiring a minimum of mechanical equipment.

EXAMPLE

Particles of a size of about 30×12×5 mm, pigmented in three colurs, were made out of a compound comprising 60 parts by weight of S-PVC, K-value 68, 20 parts by weight of dioctylphthalate, 20 parts by weight of chalk, 1 part by weight of color pigments, 1 parts by weight of usual stabilizer. The particles were continuously piled up to a layer of 25 mm height with a capacity of 400 kg/h on the belt. The width of the piled up material layer was about 1300 mm. The traveling speed through the press was 0.6 m/min. The material temperature after preheating was about 100° C., the material then was heated within the press treating zone up to 190° C. When the pressed sheet left the press it had a temperature of 100° C., the pressed sheet had a thickness of 5 mm. The pressure in the press was 40 kp/cm², the press length 3.4 m, whereby the heating zone had a length of 1.8 m.

What is claimed is:

1. A process for the continuous manufacture of a sheet from thermoplastic synthetic resins, especially a sheet suitable as covering material for use in the construction field, which comprises applying thermoplastic synthetic resin, in the form of particles on a continuously moving support to form a sheet-like layer of raw material consisting of said particles on said moving support; transporting the raw material layer through a heating zone to thereby preheat the raw material layer to an elevated temperature; pressing the preheated raw material layer continuously over its full area while traveling through a pressing treatment zone having two treatment phases, in the first treatment phase, the layer of raw material is compacted under the effect of the pressing pressure and the particles are heated to a welding temperature to form a thermoplastic sheet comprised of said welded particles and, in the second, directly succeeding treatment phase, the sheet is cooled and is simultaneously pressed under the same pressing pressure applied in the first treatment phase and thereafter removing the sheet of welded particles from said moving support.

2. A process according to claim 1, wherein the sheet is cooled to a temperature approximately in the range from 120° to 140° C. and is thereafter embossed.

3. A process according to claim 1, wherein the sheet is cooled to a temperature approximately in the range from 50° to 80° C. and is thereafter split.

4. A process according to one of claims 1–3, wherein the particles are applied in a to-and-fro motion transversely across the moving support up to a desired thickness of the material layer.

5. A process according to claim 1, wherein particles of said material are utilized having the same or a different composition of the material.

6. A process according to claim 1, wherein at least a portion of the particles is provided with a colored and-/or conductive encasing, on the basis of coloring agents, carbon black pastes, or metal pastes.

7. A process according to claim 1, wherein the particles are applied, to form the layer of raw material, onto a supporting sheet or a textile supporting sheet of fleeces, mats, fabrics, meshworks of mineral and/or synthetic resin fibers, including fibers, polyester fibers or polyamide fibers, and are pressed into a composite sheet in the treatment zone.

8. A process according to claim 1, wherein the particles comprise a vinyl chloride polymer and/or copolymer of vinyl chloride, which contains plasticizers, as well as optionally additional auxiliary agents and fillers.

9. A process according to claim 1, wherein the particles comprise thermoplastic synthetic resin partially including acrylates, polyesters or ethylene vinyl acetate.

10. A process according to claim 1, wherein the particles are made of crosslinkable thermoplastic synthetic resins, such as ethylene-propylene copolymers, ethylene-propylene terpolymers.

11. A process according to claim 10, wherein after pressing and welding the particles together into the sheet, crosslinking of the synthetic resin is carried out either within the treatment zone or after leaving the treatment zone.

12. A process according to claim 1, wherein a sheet is produced having a thickness from 1.5 mm to at least 10 mm.

13. A process according to claim 1, wherein the particles forming the layer of raw material are applied to an endlessly revolving bottom belt providing said moving support and are preheated thereon, and thereafter the topside of the layer of raw material is covered with an endlessly revolving top belt and the resulting covered layer is drawn continuously through a double ram press formed around said top belt and said bottom belt, said press being heated in an inlet zone providing said first treatment phase and cooled in an outlet zone providing second treatment phase.

14. A process according to claim 13, wherein the raw material layer is supported along the sides by concomitantly revolving belts while traveling through the press.

15. A process according to claim 1, wherein a sheet is produced having a thickness from 4 to 8 mm.

16. A process according to claim 1, wherein the processing (travelling) speed is from 0.5 m/min. to at least 2.0 m/min.

17. A process according to claim 1, wherein the heating of the material layer in the treatment zone is effected by electrical resistant heating means, which are heated up to 160° to 220° C.

18. A process according to claim 1, wherein the cooling of the material layer in the treatment zone is effected by cooling water of a temperature of 20° to 100° C., flowing within channels in the vibrating press metal plates.

19. A process according to claim 1, wherein the treatment zone is formed by a double ram vibrating press which includes a pair of endless conveyor belts that engage the upper and lower surfaces of the sheet formed within said press.

20. A process according to claim 1, wherein the layer of raw materials is preheated to a temperature approximately in the range of from 100° to 140° C., the layer of raw material is subjected to a pressing pressure in the range of from about 10 to 60 kp/cm² and is heated to a temperature in the range of from about 160° to 220° C. in the first treatment phase of said pressing treatment zone.

* * * * *